United States Patent
Kerr et al.

[11] Patent Number: 5,949,463
[45] Date of Patent: Sep. 7, 1999

[54] IMAGE PROCESSOR FOR PROCESSING VARIOUS SIZES OF A PROCESSING MEDIUM

[75] Inventors: Roger Stanley Kerr, Brockport; Edward P. Furlani, Lancaster; Svetlana Reznik, Rochester, all of N.Y.

[73] Assignee: Eastman Kodak Company, Rochester, N.Y.

[21] Appl. No.: 08/646,181

[22] Filed: May 7, 1996

[51] Int. Cl.⁶ .............................. B41J 2/385; G03G 13/04
[52] U.S. Cl. .......................................................... 347/139
[58] Field of Search ............................ 346/138; 347/139; 355/219, 285; 399/373, 376, 389, 394, 214, 304; 271/275, 901; 400/583, 583.2, 608, 613.1; 101/415.1, 408, 389.1; 248/309.4

[56] References Cited

U.S. PATENT DOCUMENTS

| | | | |
|---|---|---|---|
| 3,581,257 | 5/1971 | Priessnetz | 346/138 |
| 5,260,714 | 11/1993 | Decook et al. | 347/264 |
| 5,264,867 | 11/1993 | DeCook et al. | 347/262 |
| 5,270,731 | 12/1993 | Kerr et al. | 346/24 |
| 5,276,464 | 1/1994 | Kerr et al. | 346/134 |
| 5,278,579 | 1/1994 | Kerr et al. | 347/257 |
| 5,301,099 | 4/1994 | Kerr | 346/138 |

FOREIGN PATENT DOCUMENTS 0076920  4/1983  European Pat. Off. ............... 346/138

OTHER PUBLICATIONS

*Webster's II New Riverside University Dictionary*, 1994, p. 69.

*Primary Examiner*—N. Le
*Assistant Examiner*—L. Anderson
*Attorney, Agent, or Firm*—Peyton C. Watkins

[57] ABSTRACT

An imaging processor for receiving a medium for processing, the processor comprises an imaging drum having a rigidly attached lip portion for receiving an edge of the medium; and a movable stop disposed on and magnetically attracted toward the imaging drum for receiving a second edge of the medium for permitting the retention of medium of various dimensions.

16 Claims, 7 Drawing Sheets

IMAGE PROCESSOR FOR PROCESSING VARIOUS SIZES OF A PROCESSING MEDIUM

FIELD OF THE INVENTION

The invention relates generally to the field of lathe bed scanners utilizing a rotating imaging drum for maintaining the positional relationship of donor element and receiver elements during the writing process and, more particularly, to such imaging drums having two movable, multi-positional rings for permitting retention of various widths of receiver and donor elements on the drum.

BACKGROUND OF THE INVENTION

Color-proofing is the procedure used by the printing industry for creating representative images that replicate the appearance of printed images without the cost and time required to actually set up a high-speed, high-volume printing press to print an example of the images intended. One such color proofer is a lathe bed scanner which utilizes a thermal printer having half-tone capabilities. This printer is arranged to form an image on a thermal print medium, or writing element, in which a donor transfers a dye to the writing element upon a sufficient amount of thermal energy. This printer includes a plurality of diode lasers which can be individually modulated to supply energy to selected areas of the medium in accordance with an information signal.

A print-head includes one end of a fiber optic array having a plurality of optical fibers that are coupled to the diode lasers for transmitting the signals from the laser to the print head. The writing element is supported on a rotatable imaging drum, and the print-head with the fiber optic array is movable relative to the longitudinal axis of the drum. The dye is transferred to the writing element as the radiation, transferred from the diode lasers to the donor element by the optical fibers, is converted to thermal energy in the donor element.

The cylindrical-shaped imaging drum includes a lip portion at both ends having a depth substantially equal to the depth of the writing element for supporting the writing element therein. The donor, which is slightly wider in width than the writing element, rests its center portion atop the writing element with its edges resting on the lip portions. This configuration eliminates any crease from occurring at the edges of the donor as they are drawn over the writing element during the loading of the donor. Such creases create undesirable effects on the writing element during printing.

Although the presently known and utilized scanner is satisfactory, it is not without drawbacks. The lip portions are permanently affixed to the imaging drum at its ends, and when a narrow-width writing element is placed on the drum, a gap is created between each lip portion and the edge of the writing element to which it is adjacent. The donor is placed atop the writing element with its center portion atop the writing element, and it extends outwardly over the gap so that its edges rest atop the lip portion. Consequently, the donor will not have adequate support at its portion directly above the gap. This will obviously result in undesirable creases in the donor sheet. Alternatively, a new imaging drum with a smaller width between the lip portions may be installed. This is also undesirable due to the cost of a new drum, downtime and the labor required to install it.

Consequently, a need exists for improvements in the construction of the lathe bed scanner so as to overcome the above-described shortcomings.

SUMMARY OF THE INVENTION

The present invention is directed to overcoming one or more of the problems set forth above. Briefly summarized, according to one aspect of the present invention, the invention resides in an imaging processor for receiving a medium for processing. The processor comprises an imaging receptacle having a rigidly attached lip portion for receiving an edge of the medium; and a movable stop disposed on and magnetically attracted toward said receptacle for receiving a second edge of the medium for permitting the retention of medium of various dimensions.

It is an object of the present invention to overcome the above-described drawbacks.

It is an advantage of the present invention to provide a cost-efficient device for implementing the present invention.

It is a feature of the present invention to provide a movable stop disposed on and magnetically attracted toward the imaging drum for receiving a second edge of the writing element for permitting the retention of writing elements of various dimensions.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1:
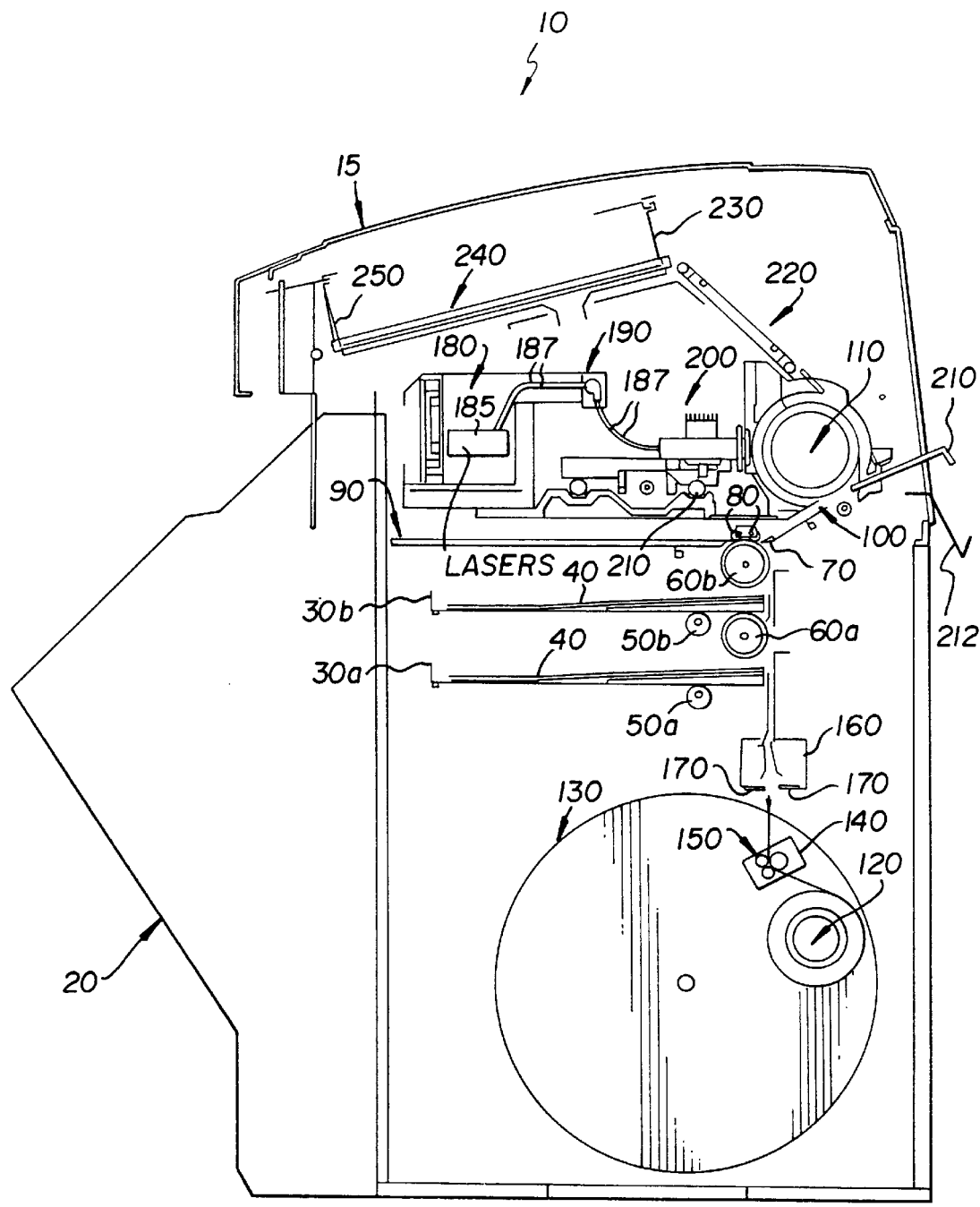
FIG. 1 is a side view in vertical cross section of a lathe bed scanner of the present invention.

Referring to FIG. 1, there is illustrated a lathe bed scanner 10 of the present invention having a housing 15 for forming a protective cover. A movable, hinged door 20 is attached to a front portion of the housing 15 for permitting access to two media trays, a lower tray 30a and upper tray 30b, that are positioned in an interior portion of the housing 15 for supporting receiver material 40, typically paper, thereon. It is obvious to those skilled in the art that only one media tray 30 will dispense receiver material 40 out of its paper tray 30 for creating an image thereon; the alternate media tray 30 either holds an alternative type of paper or functions as backup. In this regard, the lower media tray 30a includes a cam 50a for lifting the paper 40 upwardly toward a rotatable, lower media roller 60a and, ultimately, toward a second rotatable, upper media roller 60b which, when both are rotated, permits the receiver material 40 to be pulled upwardly towards a media guide 70. The upper media tray 30b also includes a cam 50b for lifting the receiver material 40 toward the upper media roller 60b which directs it towards the media guide 70.

As illustrated by the phantom position, the movable media guide 70 directs the receiver material 40 under a pair of rollers 80 which engages the receiver material 40 for assisting the upper media roller 60b in directing it onto a staging tray 90. The media guide 70 is attached and hinged to the interior of the housing 15 at one end, and is uninhibited at its other end for permitting multiple positioning of the media guide 70. The media guide 70 then rotates its uninhibited end downwardly, as illustrated by the solid line, and the direction of rotation of the upper media roller 60b is reversed for forcing the receiver material 40 resting on the staging tray 90 back under the rollers 80, upwardly through an entrance passageway 100 and around a rotatable imaging drum 110.

Four rolls of donor material 120 (only one is shown) are connected to a carousel 130 in a lower portion of the housing 15, and each roll includes a donor material 120 of a different color, typically black, yellow, magenta and cyan. These donor materials are ultimately cut into sheets and passed to the imaging drum for forming a medium from which dyes imbedded therein are passed to the receiver material resting thereon, which process is described in detail herein below. In this regard, a drive mechanism 140 is attached to each roll 120, and includes three rollers 150 through which the donor material 120 of interest is rolled upwardly into a knife assembly 160. After the donor material 120 reaches a predetermined position, the rollers 150 cease driving the donor material 120 and two blades 170 positioned at the bottom portion of the knife assemble cut the donor material 120 into a sheet. The media rollers 60a and 60b and media guide 70 then pass the donor material 120 onto the drum 110 and in registration with the receiver material 40 using the same process as described above for passing the receiver material 40 onto the drum 110. The donor material 120 rests atop the receiver material 40 with a narrow gap between the two created by microbeads imbedded into the receiver material 40.

A laser assembly 180 includes twenty lasers 185 in its interior, and these lasers are connected via fiber optic cables 187 to a coupling head 190 and ultimately to a write head 200. The write head 200 creates thermal energy from the signal received from the lasers 185 causing the donor material 120 to pass its dye across the gap to the receiver material 40. The write head 200 is attached to a lead screw 210 via a nut (not shown in FIG. 1) for permitting it to move axially along the longitudinal axis of the drum 110 for writing data onto the receiver material 40.

For writing, the drum 110 rotates at a constant velocity, and the write head 200 begins at one end of the receiver material 40 and traverses the entire length of the receiver material 40 for completing the transfer process for the particular donor material resting on the receiver material 40. After the donor material 120 has completed its dye transfer, the donor material 120 is then transferred from the drum 110 and out of the housing 15 via a skive or ejection chute 210. The donor material eventually comes to rest on a donor material tray 212 for permitting removal by a user. The above-described process is then repeated for the other three rolls of donor material.

After all four sheets of donor material have transferred their dyes, the receiver material 40 is transported via a transport mechanism 220 through an entrance door 230 and into a dye binding assembly 240 where it rests against an exit door 250. The entrance door 230 is opened for permitting the receiver material 40 to enter into the dye binding assembly 240, and shuts once it comes to rest in the dye binding assembly 240. The dye binding assembly 240 heats the receiver material 40 for further binding the transferred dye on the receiver material 40 and for sealing the microbeads thereon. After heating, the exit door 250 is opened and the receiver material 40 with the image thereon passes out of the housing 15 and comes to rest against a stop 260.

Figure 2:
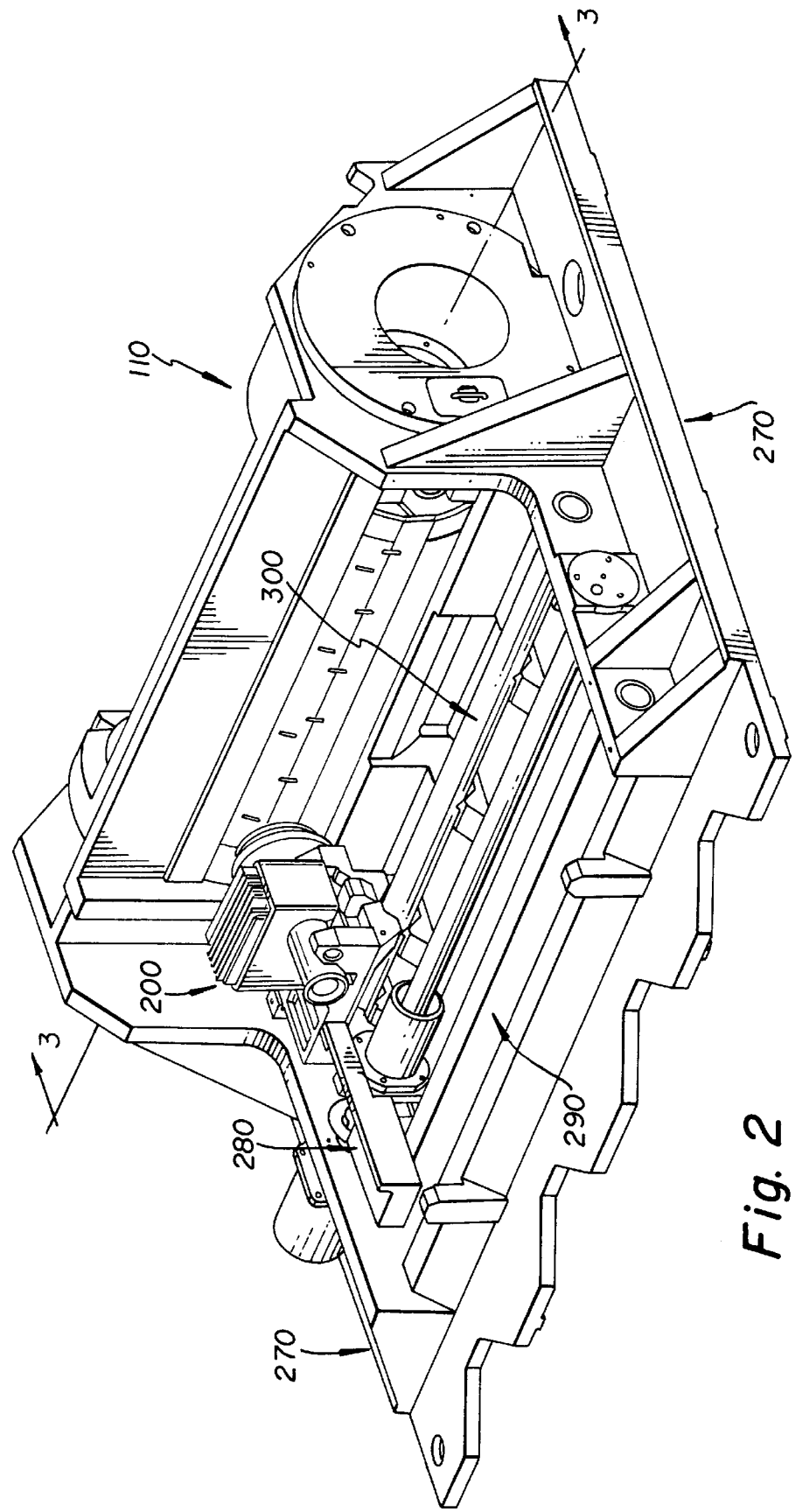
FIG. 2 is a perspective view of an imaging drum, laser writer and lead screw of the present invention.

Referring to FIG. 2, there is illustrated a perspective view of the imaging drum 110 and write head 200 of the lathe bed scanner 10. The imaging drum 110 is mounted for rotation about an axis (x) in a frame support 270. The write head 200 is movable with respect to the imaging drum 110, and is arranged to direct a beam of actinic light to the donor material 120 (shown in FIG. 1). The write head 200 contains therein a plurality of writing elements (not shown) which can be individually modulated by electronic signals from the laser diodes 185, which signals are representative of the shape and color of the original image, so that each dye is heated to cause volatilization only in those areas in which its presence is required on the receiver material 40 to reconstruct the color of the original object.

The write head 200 is mounted on a movable translator member 280 which, in turn, is supported for low friction slidable movement on bars 290 and 300. The bars 290 and 300 are sufficiently rigid so that they do not sag or distort between the mounting points at their ends and are arranged as parallel as possible with the axis (x) of the imaging drum 110. The upper bar 300 is arranged to locate the axis of the writing head 200 precisely on the axis (x) of the drum 110 with the axis of the writing head perpendicular to the drum axis (x). The upper bar 300 locates the translator member 280 in the vertical and the horizontal directions with respect to the axis of the drum 110. The lower bar 290 locates the translator member 280 only with respect to rotation of the translator about the bar 290 so that there is no overconstraint of the translator member 280 which might cause it to bind, chatter, or otherwise impart undesirable vibration to the writing head 200 during the generation of an image.

Figure 3:
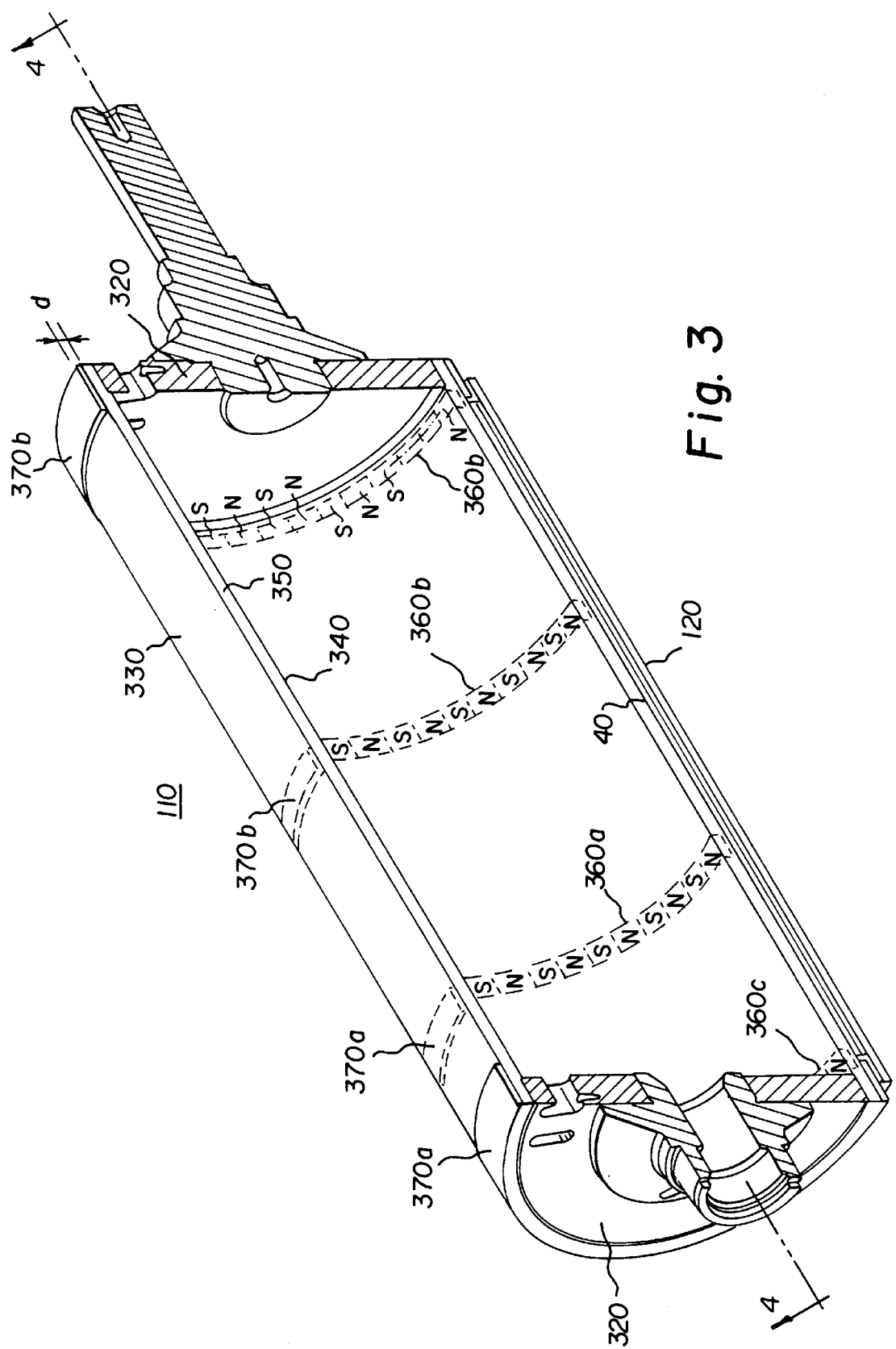
FIG. 3 is view in vertical cross section of the imaging drum of the present invention.
Figure 4:
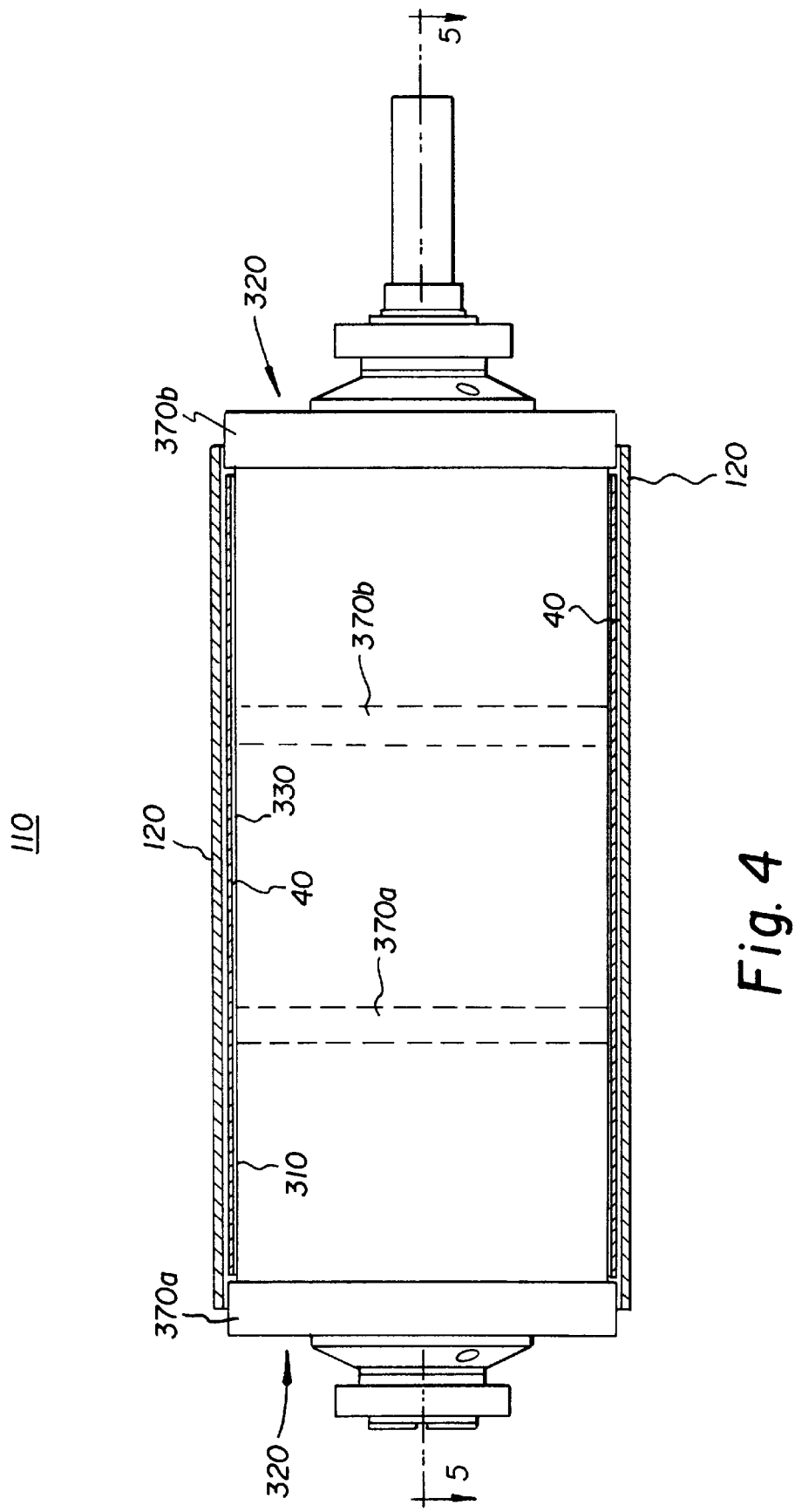
FIG. 4 is a side view of the imaging drum of FIG. 3.

Referring to FIGS. 3 and 4, there are illustrated two views of the imaging drum 110. The drum 110 includes a cylindrical-shaped housing 310 partially enclosed on both ends by an end plate 320. The housing 310 includes an outer surface 330, an inner surface 340 and an interior portion 350 therebetween. Four circular-shaped magnets 360a, 360b, 360c, and 360d are embedded into the interior portion 350, and extend around the entire circumference of the housing 310. Each magnet 360 includes a plurality of both north and south poles alternately positioned thereon.

Two movable, multiple-position, metallic rings 370a and 370b are positioned circumferentially on the outer surface 330 of the housing 310, and are respectively attracted magnetically to the magnets 360c and 360d for maintaining them in their outer position, as indicated by the solid lines. Each ring 370 includes a depth (d) that is slightly greater than the depth of a receiver material 40, typically 0.2 millimeters, for supporting the receiver material 40 therebetween. The donor material 120 includes a width that is slightly greater than the receiver material 40, and rests with its center portion abutting the receiver material 40 and its two outer edges resting respectively on the rings 370. The rings 370 are manually slidable along the outer surface 330 for permitting the user to position them at a plurality of positions on the outer surface 330. It will be apparent to those skilled in the art that less friction exists between the outer surface 330 and the rings 370 when they are not positioned directly over any of the magnets 360 for permitting efficient manual movement, and the friction reaches its maximum when the rings 370 are directly over a magnet 360. The rings 370 are semi-rigidly attached to the housing 310 when they are directly over a magnet 360 for permitting them to be maintained in this position when the drum 110 is operating. Although only four magnets 360 are shown, a plurality of such magnets 360 may be placed in the interior portion 350 for permitting the rings 370 to be placed at each of these locations.

For receiving a narrow-width receiver material 40, each ring 370a and 370b is manually moved inwardly toward the center of the drum and respectively over the magnet 360a and 360b, the dashed ring position. The dashed ring 370 position is pre-selected so that the narrow-width receiver material 40 (not shown in FIGS. 3 and 4) matingly and snugly fits between the rings 370 without creating a gap therebetween. The receiver material 40 is placed between the rings 370 and the donor material 120 is placed with its center portion on the receiver material 40 and its edges on the rings 370. This configuration permits the imaging drum 110 to receive a plurality of various-size donor 120 and receiver material 40.

Figure 5:
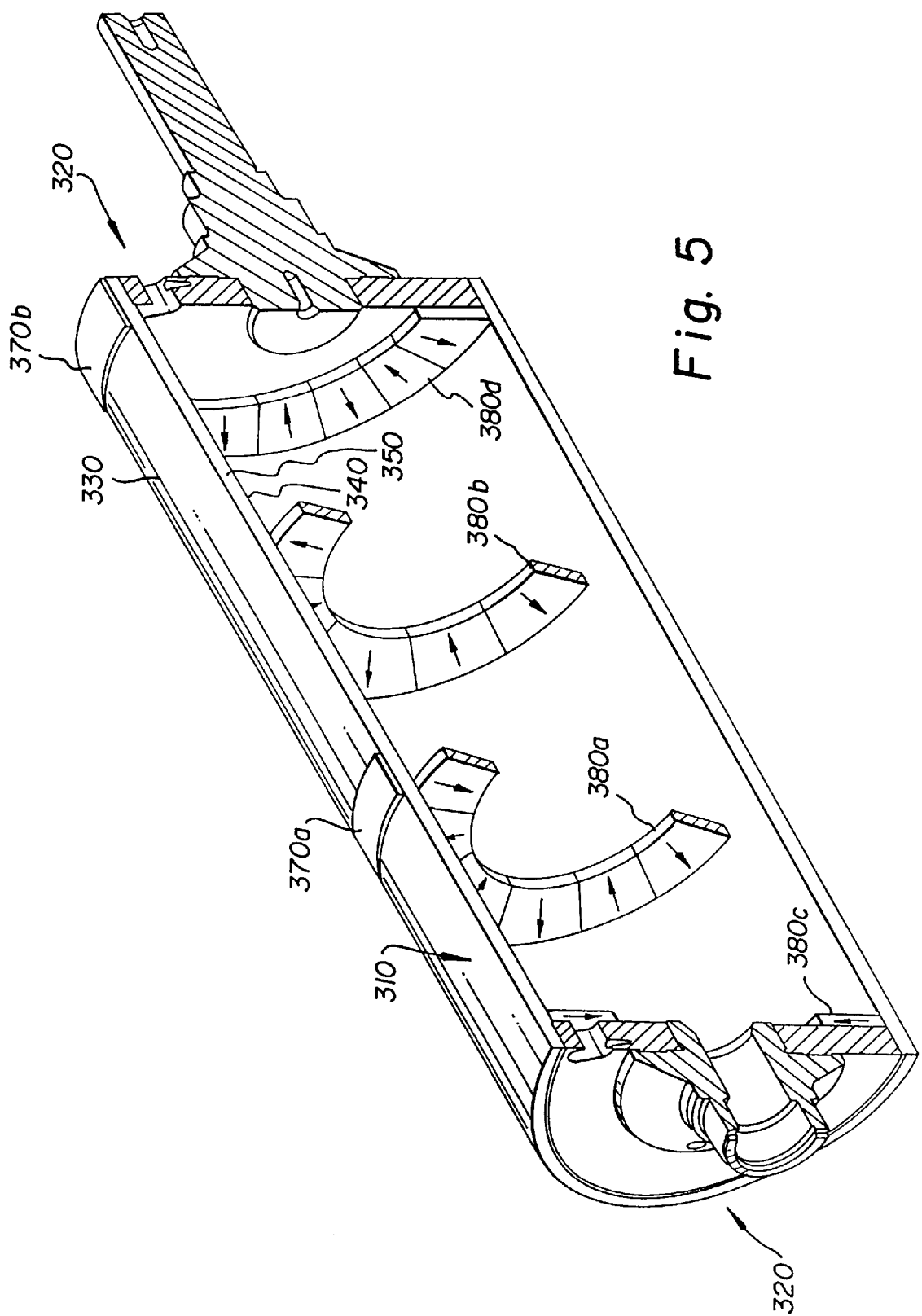
FIG. 5 is an alternative embodiment of FIG. 3.

Referring to FIG. 5, in an alternative embodiment of the present invention, four annular-shaped magnets 380a, 380b, 380c and 380d are disposed abutting against the inner surface 340 of the housing 310. Such annular-shaped magnets 380 perform the same function for magnetically attracting the rings 370 as the magnets 360 in FIG. 3. Although only four annular-shaped magnets 380 are shown, a plurality of such magnets 380 may be placed against the inner surface 340 for permitting the rings 370 to be placed at each of these locations.

Figure 6:
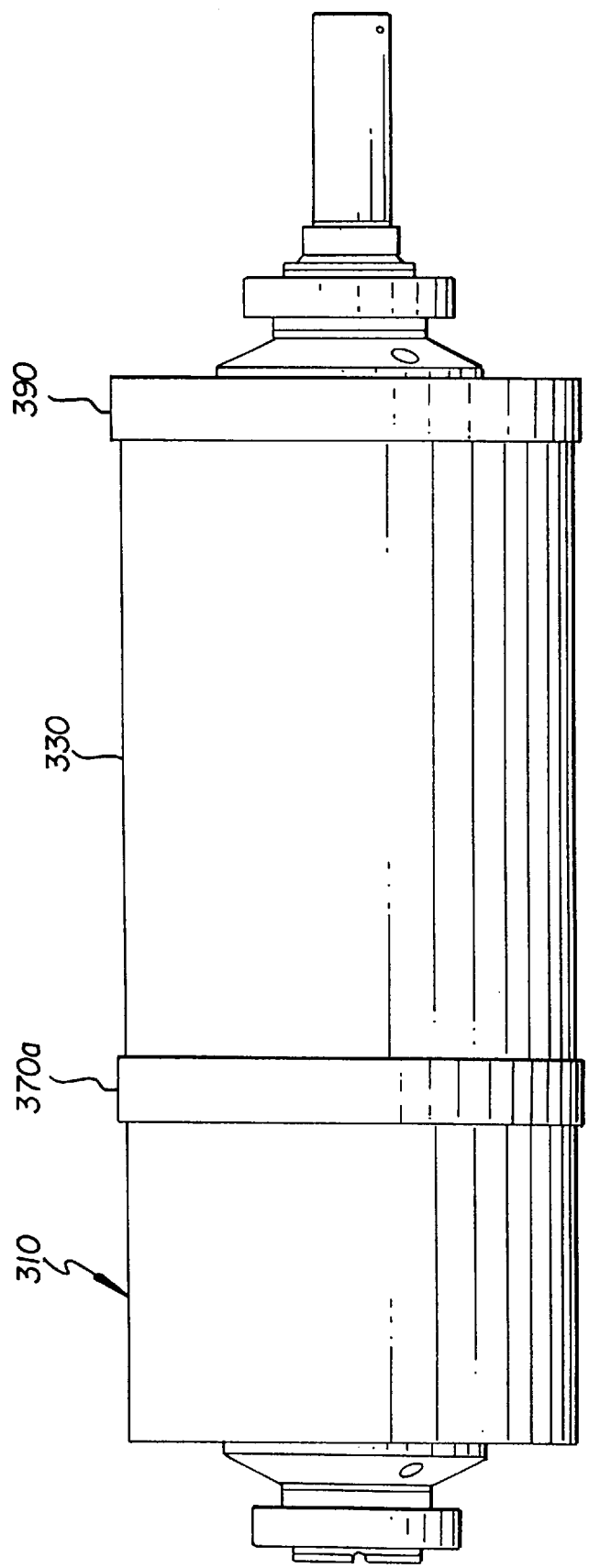
FIG. 6 is another alternative embodiment of FIG. 3.

Referring to FIG. 6, an additional alternative embodiment includes substituting either of the rings 370 with a lip portion 390 permanently attached at one end of the housing; the other ring, 370a in this example, remains slidable along the outer surface 330 as described above.

Figure 7:
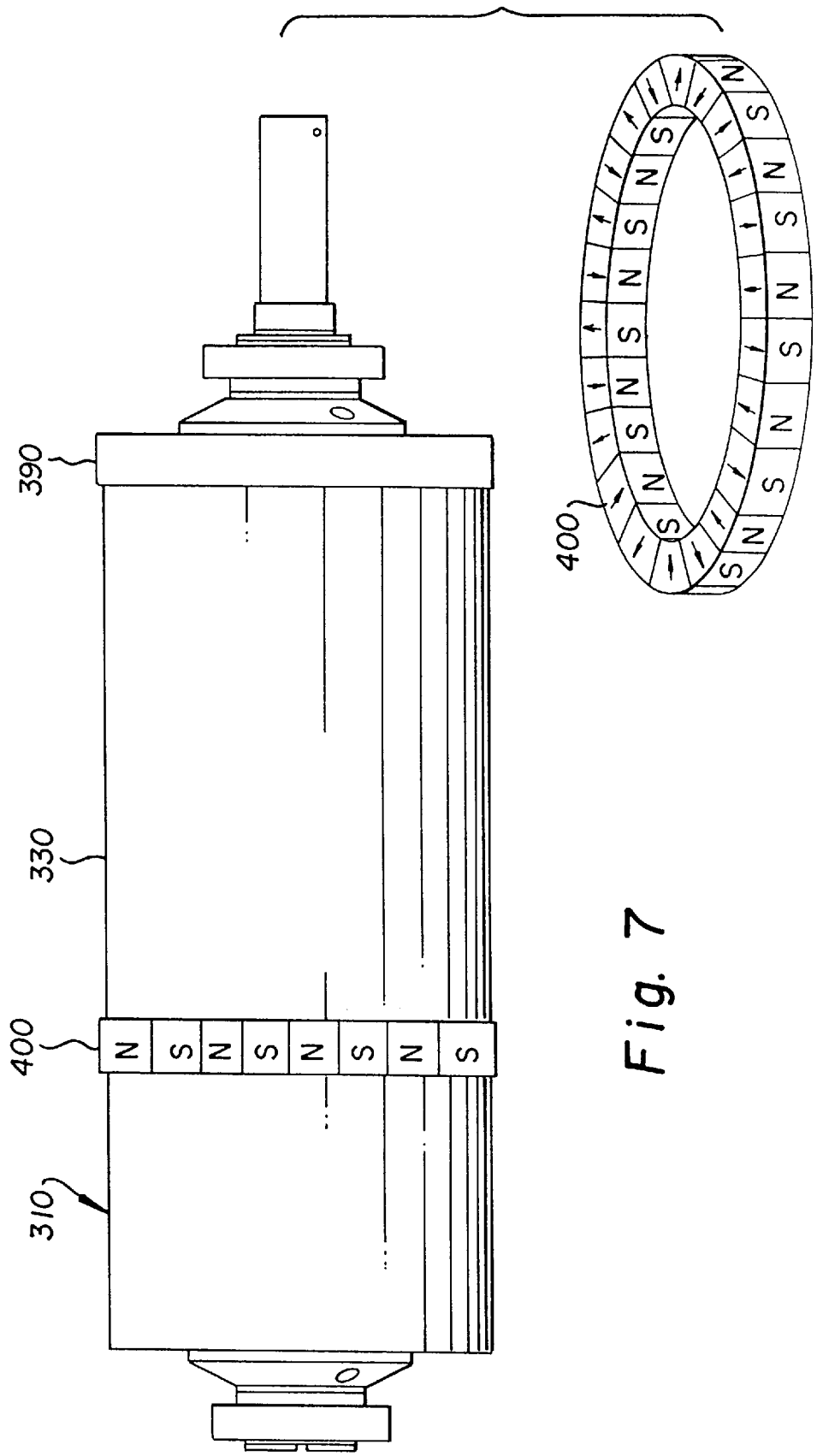
FIG. 7 is still another alternative embodiment of FIG. 3.

Referring to FIG. 7, still another alternative embodiment is shown. The housing 310 is preferably made of a ferromagnetic material (such as iron), and a magnet 400 having a plurality of poles is placed over the housing 310 for magnetically attracting it to the housing 310 and for receiving one edge of the receiver material 40. The magnet 400 is also slidable over the outer surface 330 for permitting it to be positioned in a plurality of positions thereon. The lip portion 390 is permanently attached to the housing 310 at one end for receiving the opposite edge of the receiver material 40. This configuration also permits the retention of various size donor 120 and receiver 40 materials. Those skilled in the art will recognize that the lip portion 390 may be substituted with a magnet 400 for permitting it to also be placed at any desired position on the outer surface.

The invention has been described with reference to a preferred embodiment. However, it will be appreciated that variations and modifications can be effected by a person of ordinary skill in the art without departing from the scope of the invention.

Parts List 10 scanner
15 housing
20 door
30 media tray
30a lower tray
30b upper tray
40 receiver material
50 cams
50a cam
50b cam
60 media rollers
60a lower media roller
60b upper media roller
70 media guide
80 rollers
90 staging tray
100 entrance passageway
110 imaging drum
120 rolls of donor material
130 carousel
140 drive mechanism
150 rollers
160 knife assembly
170 blades
180 laser assembly
185 lasers
187 optic cables
190 coupling head
200 write head
210 lead screw
210 ejection chute
212 donor material tray
220 transport mechanism
230 entrance door
240 dye binding assembly
250 exit door
260 stop
270 frame support
280 translator member
290 lower bar
300 upper bar
310 cylindrical-shaped housing
320 end plate
330 outer surface
340 inner surface
350 interior portion
360a circular-shaped magnet
360b circular-shaped magnet
360c circular-shaped magnet
360d circular-shaped magnet
370a ring
370b ring
380a annular-shaped magnet
380b annular-shaped magnet
380c annular-shaped magnet
380d annular-shaped magnet
390 lip portion
400 magnet

We claim:

1. An imaging processor for receiving a medium for processing, the processor comprising:

(a) an imaging receptacle having a rigidly attached lip portion for abutting a first outer peripheral edge of the medium which peripheral first edge forms a boundary of the medium and abuts said lip portion so that the entire surface of the medium opposite said imaging receptacle is exposed; and (b) a movable stop disposed on and magnetically engaging said receptacle for abutting a second outer peripheral edge of the medium which second outer peripheral edge forms a boundary of the medium and abuts said movable stop for permitting the retention of medium of various dimensions in that that the first and second edges of the medium are disposed abuttingly between said lip portion and said movable stop, and in that the entire surface of the medium opposite said imaging receptacle is exposed.

2. The imaging processor as in claim 1, wherein said imaging receptacle includes a magnet imbedded in a surface of said receptacle for magnetically attracting said stop.

3. The imaging processor as in claim 2, wherein said imaging receptacle is a drum.

4. The imaging processor as in claim 1, wherein said imaging receptacle includes an exterior surface for receiving the medium and an interior surface disposed opposite said exterior surface, and further comprises a magnet disposed adjacent the interior surface for magnetically attracting said stop toward said imaging receptacle.

5. The imaging processor as in claim 1, wherein said movable stop is a magnet which is magnetically attracted toward said imaging receptacle.

6. An imaging processor for receiving a medium for processing, the processor comprising:

(a) an imaging receptacle for receiving the medium;

(b) a first movable stop disposed on and magnetically engaging said receptacle for abutting a first outer peripheral edge of the medium which outer peripheral edge forms a boundary of the medium and abuts said first movable stop for permitting the retention of medium of various dimensions so that the entire surface of the medium opposite said imaging receptacle is exposed; and (c) a second movable stop disposed on and magnetically engaging said receptacle for abutting a second outer peripheral edge of the medium which outer peripheral edge forms a boundary and abuts said second movable stop for permitting the retention of medium of various dimensions in that the first and second edges of the medium are disposed abuttingly between said first and second movable stops, and in that the entire surface of the medium opposite said imaging receptacle is exposed.

7. The imaging processor as in claim 6, wherein said imaging receptacle includes first and second magnets imbedded in a surface of said receptacle for respectively magnetically attracting both said first and second stops.

8. The imaging processor as in claim 7, wherein said imaging receptacle is a drum.

9. The imaging processor as in claim 6, wherein said imaging receptacle includes an exterior surface for receiving the medium and an interior surface disposed opposite said exterior surface, and further comprises a magnet disposed adjacent the interior surface for magnetically attracting said stop toward said imaging receptacle.

10. The imaging processor as in claim 6, wherein both said first and second stops are magnets and the imaging drum is ferro-magnetic.

11. A method for maintaining the positional relationship of a medium on an imaging receptacle of an image processor, the method comprising the steps of:

(a) placing a first stop on the imaging receptacle for abutting a first outer peripheral edge of the medium which peripheral edge forms a boundary of the medium and abuts said first stop so that the entire surface of the medium opposite said imaging receptacle is exposed; and (b) magnetically attracting a second movable stop on the imaging receptacle for abutting a second outer peripheral edge of the medium which peripheral edge forms a boundary of the medium and abuts said second movable stop which permits the receptacle to retain medium of different dimensions so that the entire surface of the medium opposite said imaging receptacle is exposed.

12. The method as in claim 11, wherein step (a) includes magnetically attracting the first stop toward the imaging receptacle for permitting maneuverability of the first stop.

13. The method as in claim 11 further comprising the steps of imbedding a first magnet in a surface of the receptacle for magnetically attracting the second stop.

14. The method as in claim 13 further comprising the steps of imbedding a second magnet in the surface of the receptacle for magnetically attracting the first stop.

15. The method as in claim 11 further comprising the steps of placing a first magnet adjacent an interior surface of the imaging receptacle for magnetically attracting the second stop toward the imaging receptacle.

16. The method as in claim 15 further comprising the steps of placing a second magnet adjacent an interior surface of the imaging receptacle for magnetically attracting the first stop.

* * * * *